US006346321B1

(12) United States Patent
Stöber et al.

(10) Patent No.: US 6,346,321 B1
(45) Date of Patent: Feb. 12, 2002

(54) FILM WITH PROTECTIVE FEATURE, A METHOD OF PRODUCING IT AND ALSO ITS USE AS PACKAGING MATERIAL

(75) Inventors: Olaf Stöber, Verden; Christian Kuckertz, Walsrode; Adolf Ahrens, Häuslingen, all of (DE)

(73) Assignee: Wolff Walsrode AG, Walsrode (DE)

( * ) Notice: Subject to any disclaimer, the term of this patent is extended or adjusted under 35 U.S.C. 154(b) by 0 days.

(21) Appl. No.: 09/562,618

(22) Filed: May 1, 2000

(30) Foreign Application Priority Data

May 4, 1999 (DE) ........................................ 199 20 355

(51) Int. Cl.[7] ............................... B32B 5/16; B44F 1/12

(52) U.S. Cl. .................... 428/327; 428/195; 428/913.3; 283/73; 283/83; 283/107

(58) Field of Search ................................ 428/195, 327, 428/913.3; 283/73, 107

(56) References Cited

U.S. PATENT DOCUMENTS

| | | | | |
|---|---|---|---|---|
| 4,844,962 A | | 7/1989 | May et al. | 428/43 |
| 4,887,714 A | | 12/1989 | O'Connor | 206/411 |
| 5,298,310 A | * | 3/1994 | Havens | 428/207 |
| 5,851,615 A | * | 12/1998 | Kay | 428/209 |
| 5,946,781 A | * | 9/1999 | Kuo | 156/277 |

FOREIGN PATENT DOCUMENTS

| | | |
|---|---|---|
| EP | 093009 | 11/1983 |
| EP | 317202 | 5/1989 |
| EP | 0 585 076 | 3/1994 |
| EP | 787656 | 8/1997 |
| GB | 1095286 | 12/1967 |

* cited by examiner

*Primary Examiner*—Cathy Lam
(74) *Attorney, Agent, or Firm*—Norris McLaughlin & Marcus

(57) ABSTRACT

A plastic film comprising a plastic resin having imprinted on one of its surfaces a microtyped marking is disclosed. The film, optionally in the form of a laminate with a film of polymeric material, paper or metal foil is useful as packaging material.

9 Claims, No Drawings

FILM WITH PROTECTIVE FEATURE, A METHOD OF PRODUCING IT AND ALSO ITS USE AS PACKAGING MATERIAL

The present invention relates to films and is concerned with protective features that can be applied to the films in order to protect, in a simple way, the film or the goods packed in the film against unauthorized imitation.

The production and the sale of counterfeit goods is an everincreasing problem. Such counterfeit goods are frequently packaged in a deceptively similar manner to the genuine item in order thus to deceive potential purchasers and make them believe they are buying genuine items. This raises various problems. On the one hand, the producer of the genuine products loses business. On the other hand, the owner of the rights to the product is cheated out of his intellectual property. In many cases, still more important is the fact that the imitations are often of much lower quality and thus a not insignificant loss of image is inflicted on the producer. Furthermore, the lower quality may result in claims based on product liability, with the result that the producer of the authentic item is obliged to prove that the item responsible for the damage does not originate from him. For these reasons, it is desirable to mark authentic products in such a way that it is possible for the consumer to recognize the authenticity and that it is possible in the case of a claim to prove authenticity.

A very wide variety of goods, starting with foodstuffs and proceeding via consumer goods, such as compact discs and video cassettes, to replacement parts for cars or aeroplanes are nowadays sold in external packagings. Said packagings are frequently produced from plastic films, paper, cardboard or composites of said materials. U.S. Pat. Nos. 4,887,714 and 4,844,962 describe such packagings.

The external packagings have already been used hitherto as carrier media for protective features in order to prove the genuineness of the packaged item. The packaged item itself does not therefore have to be provided with the feature and a plurality of products of a producer of brand articles can, for example, be provided with the brand-typical protective feature without it being necessary to intervene in the manufacturing process of every individual product.

EP 0 585 076 describes the introduction of a security feature into a package in the form of an adhesive strip.

A known type of genuineness protection is the use of so-called protective labels. Stamped holograms applied to the packaging are also used, as are protective features introduced by means of tear-off strips. The latter are not always desirable since packaging machines already in use are not always designed for the use of tear-off strips. Stamped holograms or protective labels have to be applied in a separate work step, which gives rise to additional expenditure and additional costs.

The object therefore arises of incorporating a protective feature into a packaging in a simple manner so that no new, additional work steps are necessary in producing the packaging.

The invention therefore relates to printed plastic films, optionally in combination with another material, characterized in that they are imprinted with a microtype. This imprinting of the microtype is a protective feature in the context of the object set.

Suitable as films are films made of polypropylene, polypropylene copolymer, polypropylene terpolymer, polyester, polyamide, polyethylene, polyethylene copolymer, polyethylene terpolymer, poly(vinyl chloride), vinyl chloride copolymer, vinyl chloride terpolymer, polystyrene, polystyrene copolymer, polystyrene terpolymer, polycarbonate, polyketone, poly(methyl methacrylate), poly(methyl methacrylate) copolymers or cellulose (e.g., CELLOPHANE cellulose films). Preferably, biaxially oriented carrier films made of polypropylene, polypropylene copolymer, polypropylene terpolymer, polyester or polyamide are used.

Composite films made of these carrier films in any combination and also layer structures of said carrier films with other materials, such as, for example, another plastic or the same plastic, metal, in particular aluminium, or ionomers are also suitable as films. In this connection, the composites can be produced by adhesive lamination, coextrusion or vapour deposition, or a combination of said methods.

The films can also be laminated with paper as a composite packaging material, and the lamination can take place either before or after the imprinting. The paper may also be the print carrier provided with additional properties by a plastic film.

The invention furthermore relates to a method of producing an optionally laminated film of the plastic in which the film is imprinted with a microtype and optionally laminated with further films.

In accordance with the invention, imprinted packaging films are produced in such a manner that a carrier film is provided both with a standard printed image and with the protective feature in one operation. Thus, as a result of using suitable printing formes, it is possible to incorporate a protective feature within a work step that takes place in any case.

The printing can be performed either as direct printing or as transfer printing. In the case of composite films, the printing ink may also be disposed between the layers.

The carrier film may have a thickness of between 10 and 300 $\mu$m and a width of between 20 and 2000 mm. Preferably, the thickness is between 15 and 60 $\mu$m and the width between 600 and 1400 mm.

The imprinting of the carrier film may take place monochromatically or polychromatically. Any printing method usable for films is suitable. In particular, the printing takes place in typical packaging printing methods, such as offset, screen, flexographic, UV-flexographic or gravure printing. In particular, in offset or gravure printing, very particularly in gravure printing.

The microtypes are types whose letter size is less than 0.7 mm; particularly, those whose size is less than 0.3 mm; very particularly, sizes less than 0.26 mm. The types can be incorporated in any desired manner into the printed image.

Microtypes can be printed either in outline or reverse type. Outline types are obtained by printing out the lines of the letters and numerals. In the case of reverse types, on the other hand, the lines of the letters and numerals are not printed out, but, on the contrary, only the surroundings of the letters and numerals.

One embodiment has letters in normal size, i.e., greater than 0.7 mm, that are in turn made up of microtypes. If the "normal" script is closely examined with a powerful magnifying glass or a microscope, the microtype becomes recognizable.

Products can advantageously be protected against counterfeiting by the packaging materials according to the invention. The purpose of the protective element is to be able to prove legally the lack of authenticity of counterfeits when they are encountered or, alternatively, also to make it possible for the consumer, a middle man or authorities, such as customs or police, to recognize the authenticity of a product with simple means.

Printing on one side of the carrier film can take place with known printing presses. In this connection, a printing unit is designed for the printing of the microtype.

As a result of the introduction of a protective element by means of printing methods it is possible, without additional manufacturing steps, to provide packaging materials with a protective element in a particularly simple and economical manner. The invention furthermore relates therefore to the use of the film according to the invention as packaging material.

The invention is further illustrated but is not intended to be limited by the following examples in which all parts and percentages are by weight unless otherwise specified.

EXAMPLES

Example 1

A film made of biaxially oriented polypropylene having a thickness of 20 μm is imprinted in eight colours using an ink based on poly(vinyl butyral) binder. In the process, a corona treatment is applied in-line. In a ninth printing unit, lettering is printed in microtype (type size: 0.2 mm) using black ink of the same ink system.

Example 2

A film made of biaxially oriented polypropylene having a thickness of 20 μm is imprinted in eight colours using an ink based on poly(vinyl butyral) binder. In the process, a corona treatment is applied in-line. In a ninth printing unit, lettering is printed in microtype (type size:0.2 mm) using black ink of the same ink system. All the printings are performed as transfer printings. In a second manufacturing step, the imprinted film is laminated using a solvent-free laminating adhesive against a 20 μm thick, metallized, biaxially oriented polypropylene film.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A plastic film comprising a plastic resin having imprinted on one of its surfaces a microtyped marking selected from letters, numerals and combinations thereof, wherein said microtyped marking has a type size of less than 0.7 mm, and the plastic resin of said plastic film is monoaxially or biaxially oriented.

2. The plastic film of claim 1 wherein said microtyped marking is an outline microtyped marking, said outline microtyped marking being formed by printing the lines of the marking.

3. The plastic film of claim 1 wherein said microtyped marking is a reverse microtyped marking, said reverse microtyped marking being formed by printing only the surroundings of the marking.

4. The plastic film of claim 1 wherein said plastic resin is at least one material selected from the group consisting of cellulose, (co)poly(vinyl chloride), polyester, (co)polypropylene, polyamide, (co)polyethylene, (co)polystyrene, polycarbonate, polyketone and (co)poly(meth)acrylate.

5. The plastic film of claim 1 wherein said microtyped marking is applied by a gravure printing method.

6. A packaging material containing the plastic film of claim 1.

7. A laminate comprising the plastic film of claim 1.

8. The laminate of claim 7 further comprising a member selected from the group consisting of polymer film, paper and metal foil.

9. The laminate of claim 8 wherein said plastic film of said laminate is metallized.

* * * * *

UNITED STATES PATENT AND TRADEMARK OFFICE

CERTIFICATE OF CORRECTION

PATENT NO. : 6,346,321 B1

DATED : February 12, 2002

INVENTOR(S) : Olaf Stober et al.

It is certified that error appears in the above-identified patent and that said Letters Patent is hereby corrected as shown below:

Title page, Item [54] and Column 1, lines 1-3,
Change the title from "FILM WITH PROTECTIVE FEATURE, A METHOD OF PRODUCING IT AND ALSO ITS USE AS PACKAGING MATERIAL" to -- PLASTIC FILM HAVING MICROTYPED MARKING IMPRINTED ON ITS SURFACE --

Signed and Sealed this

Twenty-sixth Day of August, 2003

JAMES E. ROGAN
*Director of the United States Patent and Trademark Office*